Sept. 13, 1955 H. L. BOWDITCH 2,717,820
INDUSTRIAL RECORDING MECHANISM
Original Filed March 24, 1949 4 Sheets-Sheet 1

INVENTORS
Hoel L. Bowditch
BY
Curtis, Morris + Safford
ATTORNEYS

Sept. 13, 1955

H. L. BOWDITCH 2,717,820

INDUSTRIAL RECORDING MECHANISM

Original Filed March 24, 1949

INVENTORS
Hoel L. Bowditch
BY
Curtis, Morris + Safford
ATTORNEYS

Sept. 13, 1955  H. L. BOWDITCH  2,717,820
INDUSTRIAL RECORDING MECHANISM
Original Filed March 24, 1949  4 Sheets-Sheet 3

INVENTORS
Hoel L. Bowditch
BY
Curtis, Morris + Safford
ATTORNEYS

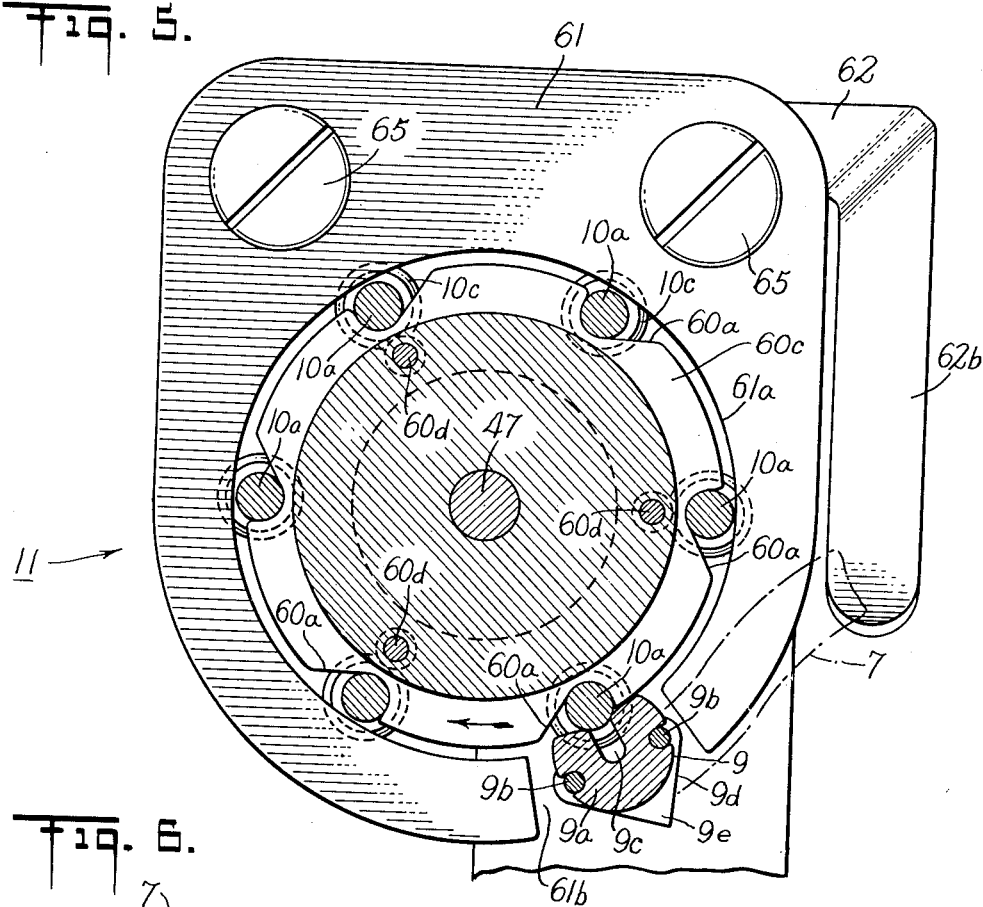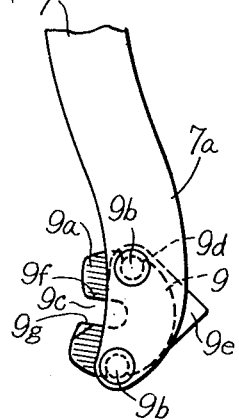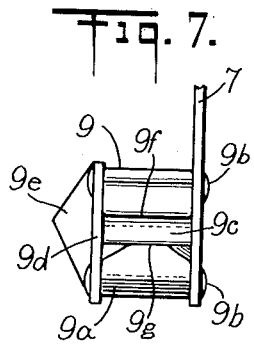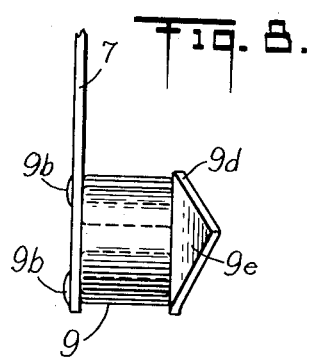

United States Patent Office 2,717,820
Patented Sept. 13, 1955

2,717,820

INDUSTRIAL RECORDING MECHANISM

Hoel L. Bowditch, Foxboro, Mass., assignor to The Foxboro Company, Foxboro, Mass.

Original application March 24, 1949, Serial No. 83,272, now Patent No. 2,674,913, dated April 6, 1954. Divided and this application February 26, 1952, Serial No. 273,403

7 Claims. (Cl. 346—140)

This invention relates to industrial recorders for producing on round or strip charts records of variable conditions such as, for example, temperature, flow, pressure, liquid level and the like, and more particularly to a novel pen and pen holder assembly and associated cooperating structures. The present application is a division of application Serial No. 83,272 filed March 24, 1949, now Patent No. 2,674,913, issued April 6, 1954.

Recorders for producing records of variable conditions are in wide use in many branches of industry. The oil, chemical, steel, milk and many other industries are large users of recording instruments. These instruments, though long used, have presented problems both to their manufacturers and users. The present invention provides satisfactory and useful solutions to several important problems.

In one type of conventional recording mechanism a pen arm carrying a pen is moved over a chart in accordance with the values of the condition being measured. The pen is in continuous contact with the chart, makes a continuous record, and uses ink that flows to the pen point. This creates the problem of trying to keep the pen point supplied with liquid ink over twenty-four hours (or longer) periods without the possibility of the ink splashing onto or otherwise smudging the chart. The present invention provides for the first time a relatively low cost recording mechanism which may be made responsive to almost any type of measuring element and which will make, on round charts or on strip charts, a substantially continuous smudge-proof record over a long period of time without requiring manual replenishment of the ink supply.

Another problem involves multi-record recorders, such as are used to record on a single chart the values of a number of different variables, i. e., a number of different pressures, temperatures, or flows, etc., or combinations thereof. Multi-record recorders are useful because they reduce the number of separate recording instruments otherwise required. This saves space, reduces the overall cost of the recording instrumentation, and provides at a conveniently viewable place the records of interrelated variables that for analysis or control purposes should be viewed on a single chart.

One conventional type of multi-record round chart instrument employs a plurality of pen arms each having a pen in continuous contact with a chart. Mechanical measuring elements such as bellows, or Bourdon tubes, floats, or even electrically or air-operating measuring mechanisms are used to move the pen arms. Such multi-record instruments, although extensively used, have several disadvantages: The pens on the several arms have to be offset so that they may swing past each other. For this reason only one of the pens of a group can be aligned with customary time arcs on the chart. Also the pens carry liquid inks of different colors, and when two pens record close to or actually swing past each other, the ink from one pen may run into that of another, thereby confusing the colors. The disadvantage of offset pens, and the possibility of ink transfer from one to another is so important that multi-record instruments have been constructed to limit the motion of the several pens so that they cannot swing past each other. In this way the pens may be aligned on the same time arc but special charts are required having a separate circular section for each pen. This construction overcomes the above disadvantages, but introduces another; namely, that the reduced motion of the pen requires condensed chart scales, and the accuracy of the records made is likely to be less than that produced by pens movable over the full chart.

Another object is to provide a relatively inexpensive multi-record recorder responsive to any type of measuring element and which eliminates the problems above, and in which (1) there is only one pen arm to record the values of the several conditions being measured, (2) there is no possibility of losing color identification, and (3) there is no extraneous force or mechanism affecting the accuracy of the records.

Another type of conventional multi-record recorder records intermittently. Printing mechanism, having a number of printing members, is moved across a strip chart. Switching mechanism successively switches a single electrically operated measuring mechanism from one measuring element to another, rotates the printing mechanism, and causes it to print periodically on the chart the position of the printing mechanism as determined by the measuring mechanism.

One of the problems of such periodically operating multi-record instruments is that of obtaining a sufficiently rapid printing cycle to obtain substantially continuous individual records. This problem becomes serious when such recorders are used to record conditions that change fairly rapidly. Merely increasing the speed of the conventional instruments is not a solution. The conventional designs utilize many moving parts having both sliding and rotating movement and subject to relatively large loads. Increasing the speed of such parts would prohibitively increase their wear and shorten their life. Also, the complicated structures of such conventional multi-record recorders have kept them expensive and for general use have limited them to strip chart applications.

Another object of the present invention is to provide a novel multi-record recorder of the intermittently printing type that is rapid in operation, has no rapidly moving parts, and is of simpler and less expensive construction than conventional multi-record instruments.

The present pen arm assembly, in the multiple record embodiment illustratively disclosed herein, includes an arm that carries a printing member and moves it over a chart in accordance with the value of the condition being recorded. For convenience we refer to the arm as a pen arm and the printing member as a pen. The pen arm is continually moved to an edge of the chart where a pen on the arm is either freshly inked or is exchanged for a different pin, whereupon the pen arm is returned to its condition-indicating position and is caused to print a record on the chart. When the mechanism is used as a multi-record recorder, the inking performed at the edge of the chart effects a color change; and simultaneously the measuring mechanism is switched to a different measuring element, or a different measuring mechanism is brought into operation.

During the printing operation the open arm is mechanically disconnected from the mechanism by which color characteristic of the pen is changed, so that at the time of printing the pen and pen arm are unaffected by any forces tending to impair the accuracy of the positioning of the pen arm by the measuring mechanism. Similarly, during the color changing operation the pen arm is disconnected from the measuring mechanism.

The invention is useful for round chart recording as well as for strip chart recording.

Other objects will be in part obvious and in part pointed out by reference to the drawings in which like reference characters refer to similar parts throughout.

In the drawings:

Figure 5 is a section taken on line 5—5 of Figure 3, and showing in vertical section the pen holder at the pen magazine;

Figure 6 is an enlarged front elevation of the pen holder mounted on the pen arm;

Figure 7 is a left side elevation of the pen holder as shown in Figure 6;

Figure 8 is a right side elevation of the pen holder of Figure 6;

Figure 9 (sheet 2) shows in enlarged detail different types of points of pens that may be used.

Figure 1:
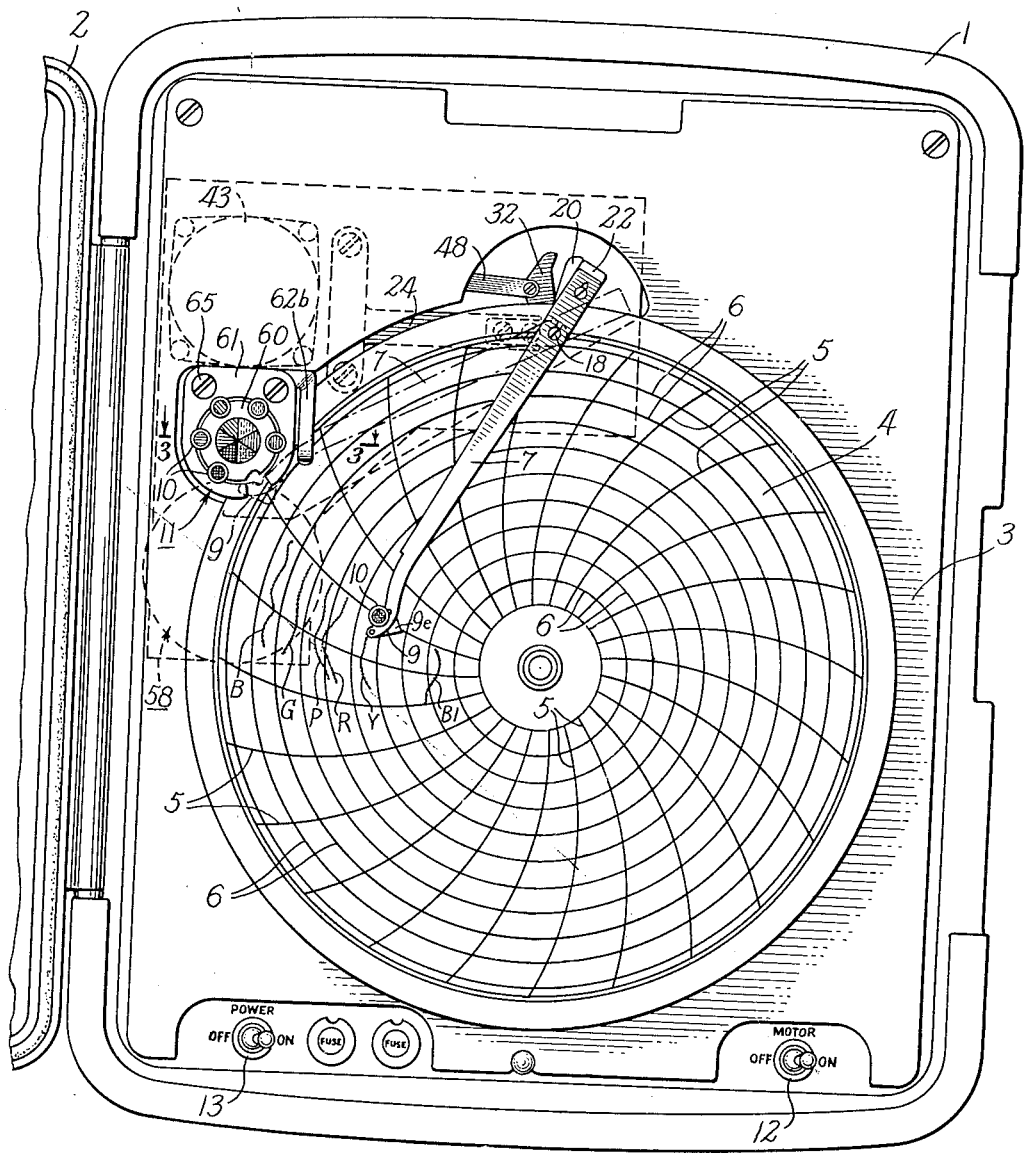
Figure 1 shows in front elevation a multi-record round chart recorder embodying the invention and mounted in a case, with the door of the instrument open.

Referring to Figure 1, the recording instrument is mounted in a case 1 normally closed by a cover 2 partly shown at the left. A removable round chart backing plate 3 provides backing for the usual chart 4 having radial time lines 5 and concentric index lines 6 representing values of pressure, temperature, flow, or the like.

A pen arm 7 is movable over chart 4 about an axis 18 in accordance with the value of a condition being measured. In this embodiment pen arm 7 carries at its free end a pen holder 9 and a pen 10, which when the pen arm is depressed, prints a dot on the chart to record the instantaneous value of the condition being measured.

At the left of the chart is a pen magazine generally indicated by numeral 11 holding six pens each of which may carry a distinctive color. Pen arm 7 is periodically swung to the magazine where a rotor in the magazine removes from pen holder 9 the pen 10 that has just printed, and replaces it with a fresh one. In the present embodiment a novel construction is used for removably carrying the pen. The pen holder 9 is magnetized and holds its pen by magnetic force, and the magazine rotor pulls the pen from the holder and moves another to the holder. Simultaneously, switching mechanism, generally indicated at 58, disconnects the measuring mechanism (also herein called condition-measuring apparatus) from one measuring element and connects it to a second one. Pen arm 7 is then returned to the chart, is positioned in accordance with the value of the second measuring element, and the pen is caused to print its position on the chart.

The operation is continuous and rapid. The structure of the present embodiment records every six seconds. The lines on the chart marked B, G, P, R, Y, and B1 are indicative of the type of records of six different conditions that the instrument might be producing on the chart.

At the lower right hand corner of the instrument a switch 12 is provided to turn on and off the motor that drives the recording mechanism. At the lower left a switch 13 serves to turn on and off the power to the electrically-operated condition-measuring apparatus not shown.

Figure 2:
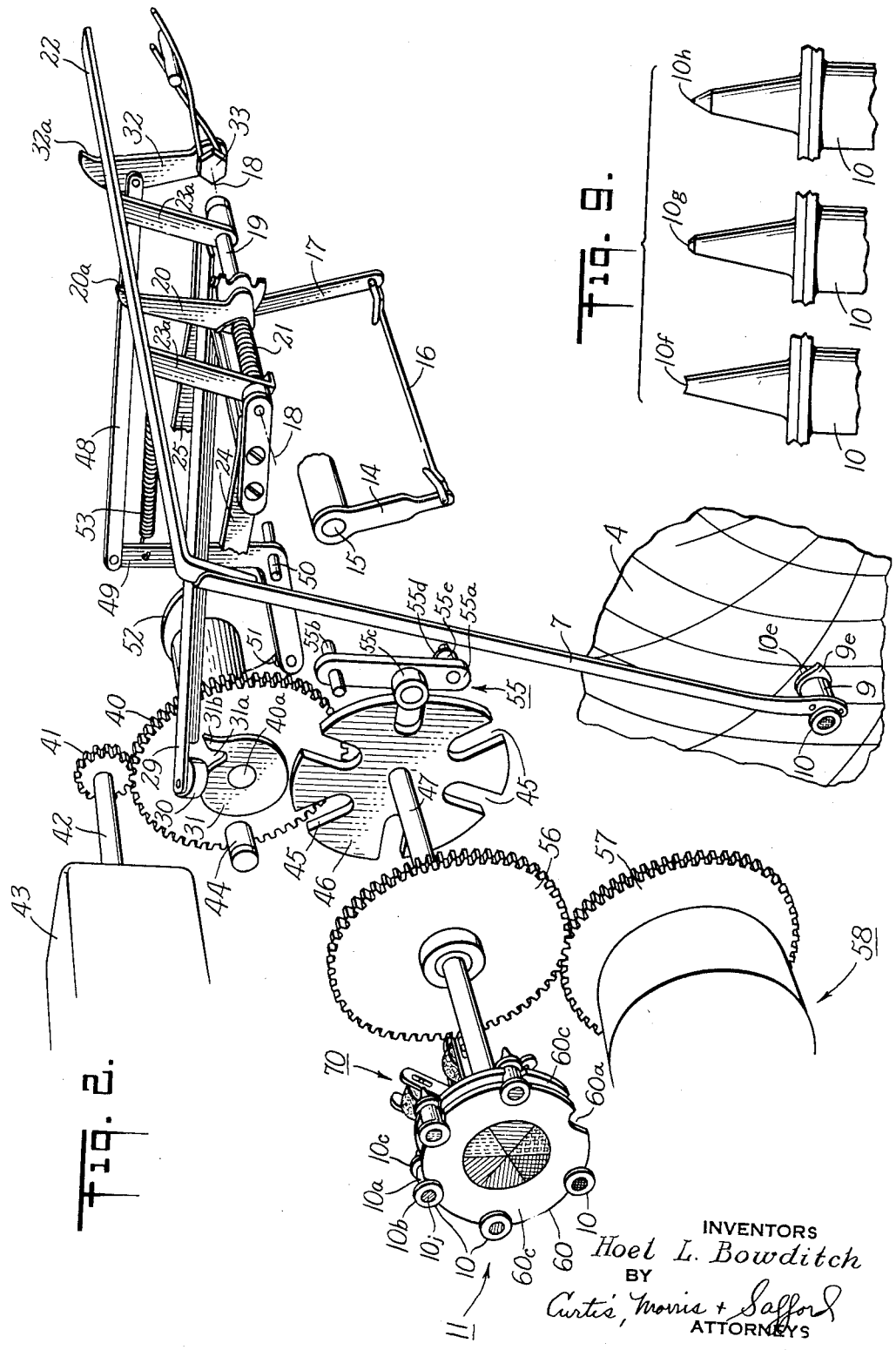
Figure 2 shows in perspective and partly diagrammatically an exploded view of operating parts of the multi-record recorder of Figure 1.

Turning now to Figure 2, an arm 14 is positioned about axis 15 by suitable electrically operated condition-measuring apparatus in accordance with the value of the condition being measured. Arm 14 through link 16 freely positions position lever 17 about axis 18. Lever 17 is secured to a shaft 19 freely rotatable in suitable bearings. Adjustably secured with respect to arm 17 and movable by it, is positioning arm 20, whose outer end has a face 20a constructed to engage and rotatably position a bail 22 supported from arms 23a, freely rotatable about axis 18. The bail extends forwardly and its forward end supports the pen arm 7. The force of gravity acting on pen arm 7 continuously urges the bail counter-clockwise and a coil spring 21 continuously urges face 20a of positioning arm 20 clockwise toward the bail. In this manner the measuring mechanism positions the pen over the chart in accordance with the value of the condition being measured.

The pen arm and pen, suitably positioned by arm 20, are caused to print by moving the pen to the chart. To this end arms 23a supporting bail 22 are suitably rotatably supported from two spaced flexible spring arms 24 and 25 that are supported at their left ends on a fixed support (not shown). Arms 24 and 25 are biased to move bail 22 inwardly, and so to move pen 10 into contact with the chart, but a cam-operated rigid printing lever 29, secured to the right end of arm 25 and extending leftward, normally holds the pen out of contact with the chart. At its left end, arm 29 carries a cam-follower 30 that rides on the side of a cam 31. Cam 31 is mounted on a shaft 40a for rotation with a gear 40 and constantly driven counter-clockwise thereby. Cam follower 30, when riding on the side surface of cam 31, holds pen arm 7 forwardly and the pen forward of the chart. But when cam-follower 30 rides into an opening 31a in cam 31, the bias of arms 24 and 25 moves the bail, pen arm, and pen sharply inwardly to cause the pen to strike against the chart and print the impression of the pen thereon. A tongue 31b on cam 31 guides cam-follower 30 to the side surface immediately following the printing operation.

When the pen arm moves toward the chart, the entire mechanism supported by arms 24 and 25 moves likewise, and connecting link 16, connecting arm 17 with arm 14 permits the relative axial movement of the two arms 14 and 17 without introducing inaccuracy into the position of pen arm 7. This is accomplished by axially positioning arm 17 on shaft 19 so that when the bail is moved into printing position, arm 17 moves into the plane of arm 14, and there is no mis-alignment of the arms at the instant the pen prints on the chart.

As shown in Figure 2, cam-follower 30 is just ready to ride into depression 31a, to cause the above-mentioned printing operation to take place, and bail 22 and pen arm 7 are being positioned by the condition-responsive mechanism through arm 20, arm 17, link 16, and arm 14.

After the printing operation (which in the present embodiment consumes approximately one-quarter of a second), mechanism described below immediately starts to swing pen arm 7 to the pen magazine at the outer edge of the chart, where the pen that has just printed is removed from pen holder 9, and a freshly inked pen is replaced in the pen holder. The same mechanism then moves pen arm 7 back into contact with positioning arm 20 for the next printing position.

The mechanism for accomplishing this change of pens and the resulting replenishing of ink will now be described. Still referreing to Figure 2, bail 22 is periodically swung clockwise about axis 18 by a driving arm 32 pivoted on stud shaft 33 on axis 18, and secured to a fixed supporting plate (not shown). Driving arm 32 has a face 32a constructed to engage bail 22 when arm 32 moves clockwise from its starting position shown in Figure 2; and when bail 22 is so engaged, it too is swung clockwise and pen arm 7 is swung to the edge of the chart. Since arm 32 turns about the same axis as do arms 23a supporting bail 22, there is no sliding motion between face 32a and the bail. As pen arm 7 reaches its leftmost position shown in dotted lines in Figure 1, it moves pen holder 9 into a recess 61b (Figure 5) of magazine 11, and the pen carried by holder 9 enters a notch 60a in a rotor 60 of the magazine. Thereafter rotor 60 rotates one-sixth of a revolution, picks the pen off the pen holder, and moves a freshly inked pen thereto.

After pen holder 9 has received its freshly inked pen, driving arm 32 swings counter-clockwise and lowers bail 22 into contact with positioning member 20, and pen 10 is ready for its next printing operation.

To accomplish the above operation, driving arm 32 is oscillated by a link 48 connected at one end to arm 32 and at its other end to the upper end of an L-shaped rocker arm 49 secured to a shaft 50. The lower end of arm 49 carries a cam-follower 51 which, under the influence of a coil spring 53, rides on the surface of a cam 52 secured to and constantly turned by spur gear 40. As cam 52 turns, cam-follower 51 rides in and out on cam 52. As cam-follower 51 rides into a depression on cam 52, it moves arm 32 clockwise, and drives pen arm 7 to the edge of the chart to present the pen holder to the magazine. Cam 52 is provided with a dwell (not shown) that holds the pen holder at the magazine while rotation of rotor 60 picks off the pen and delivers a freshly inked pen to the holder.

Turning now to the operation of the pen magazine, the gear 40 is driven at substantially constant speed by a motor 43 through a shaft 42 and a pinion gear 41 meshing with gear 40. Mounted on the constantly driven gear 40 there is a pin 44 which, during each rotation of gear 40, enters a notch 45 in a drive wheel 46 fixed to a shaft 47 on which rotor 60 is mounted. The pin forces wheel 46 to turn one-sixth of a revolution and consequently shaft 47 and rotor 60 are turned one-sixth of a revolution.

A detent mechanism generally indicated at 55 accurately positions drive wheel 46 and rotor 60 respectively to align the next successive notch 45 for entry by pin 44, and to align rotor 60 with holder 9. As the rotor 60 turns the pens carried thereby are inked by an inking mechanism 70 described in detail hereafter.

When the mechanism of Figure 2 is used as a multi-record recorder, the switching mechanism 58 is rotated one-sixth of a revolution at the same time rotor 60 is turned. This is accomplished by a gear 56, fixed on shaft 47 and meshing with and turning a gear 57 secured to the switching mechanism. Rotation of the switch mechanism connects the successive measuring elements to the condition-responsive mechanism.

It may be noted that positioning arm 20 that positions bail 22, or its mechanical equivalent, may be as shown a single member responsive to a single measuring mechanism which is switched from one measuring element to another; or a plurality of positioning arms may be employed, each permanently connected to its respective measuring element. When the latter construction is used, mechanism is provided periodically to select the arm that positions the bail and pen arm, and to hold the other positioning arms out of engagement with the bail.

As pointed out at the beginning of this specification the present divisional application is primarily directed to the pen arm assembly and magazine which are best shown in Figures 3, 5 and 6–9. Referring first to Figures 6–8, the lower end of arm 7 is curved at 7a, and carries a permanent magnet 9a secured thereto by rivets 9b. Magnet 9a is shaped (see also Figure 5) to provide a concentrated magnetic flux flow across the poles of the magnet, and in an area identified as 9c. The magnet is preferably of a highly magnetized material such as is sold under the trade name "Alnico No. 5" to provide a holder having a relatively strong magnetic force, but of minimum weight. The concentrated lines of magnetic force hold tightly against the magnet pen shank 10a (see Figure 3), which is also made from a magnetic material but is not permanently magnetized. (The term "magnetic material" is used herein to describe a material having substantial magnetic permeability and which may be in an unmagnetized, temporarily magnetized or permanently magnetized condition.)

Also attached to the under side of magnet 9a by rivets 9b is a plate 9d having a pointed extension 9e aligned with the printing tip of the pen held by the magnet. The pointed extension is useful to indicate position of the pen tip with reference to the time arc of the chart, because when the instrument is viewed from the front, the printing point of the pen is not visible.

Figure 3:
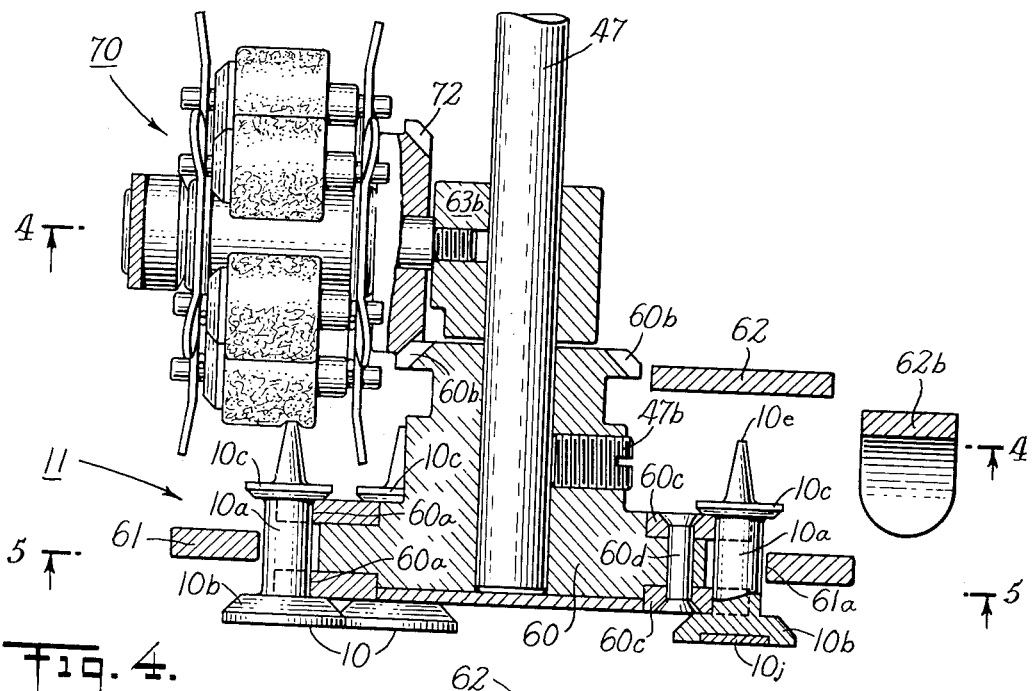
Figure 3 is an enlarged horizontal section taken on line 3—3 of Figure 1 showing details of the pen magazine and an inking mechanism.

Referring now to Figure 3, each pen has shoulders 10b and 10c at the ends of shank portion 10a which insure proper axial positioning of the pen relative to the holder. The shoulder 10c prevents axial movement of the pen with respect to the magnet when the pen strikes the chart. The shoulders are tapered as shown to guide each pen into the desired axial position relative to the holder as the magazine presents a pen to the holder. Also, the shoulders together with the concentrated magnetic flux insure correct axial alignment of the pen. It is understood that known clasp constructions may be used in place of the magnet to detachably support the pen on the holder, but the holder of this embodiment has the advantage of being light in weight, of having no moving parts, and of being positive in its action.

Referring to Figures 6 and 7, the upper inner edge 9f of the magnet runs straight across the width of the magnet, but the lower edge 9g is cut back at its ends to remove the corners as shown. With this construction, when the holder is raised to the magazine as shown in Figure 5, and rotor 60 rotates to bring another pen to the magnet 9a, if perchance the pen has any tendency to cock or mis-align itself between the two poles of the magnet, the narrow edge 9g working on the pen shank in conjunction with the wide edge 9f serves always to align the pen shank accurately on the magnet.

Reverting to Figure 3, each pen 10 has a printing end 10e. The shape of the printing end and the material from which it is constructed (such as metal, wood, plastic, etc.) is determined by factors such as the nature of the ink used, the character of the surface of the chart on which the pen is to print, the size and nature of the mark desired, and others. The shape of the metal end may be flat as shown in Figure 3; or, referring to Figure 9, may be concave as shown at 10f to carry more ink; or may have a double taper as shown at 10g; or may be pointed as shown at 10h. As shown in Figure 3, each pen may be provided with an identifying colored insert 10j to identify the color of the ink that the pen carries.

Referring now again to Figure 5, the pen-holding rotor 60 is surrounded by an outer ring 61 that holds the pens in the pen recesses 60a of the rotor. Ring 61 and other stationary parts of pen magazine 11 are mounted on a T-shaped casting 63 (see Figure 4) mounted by means of screws 65 on a fixed portion of the instrument casing.

Figure 4:
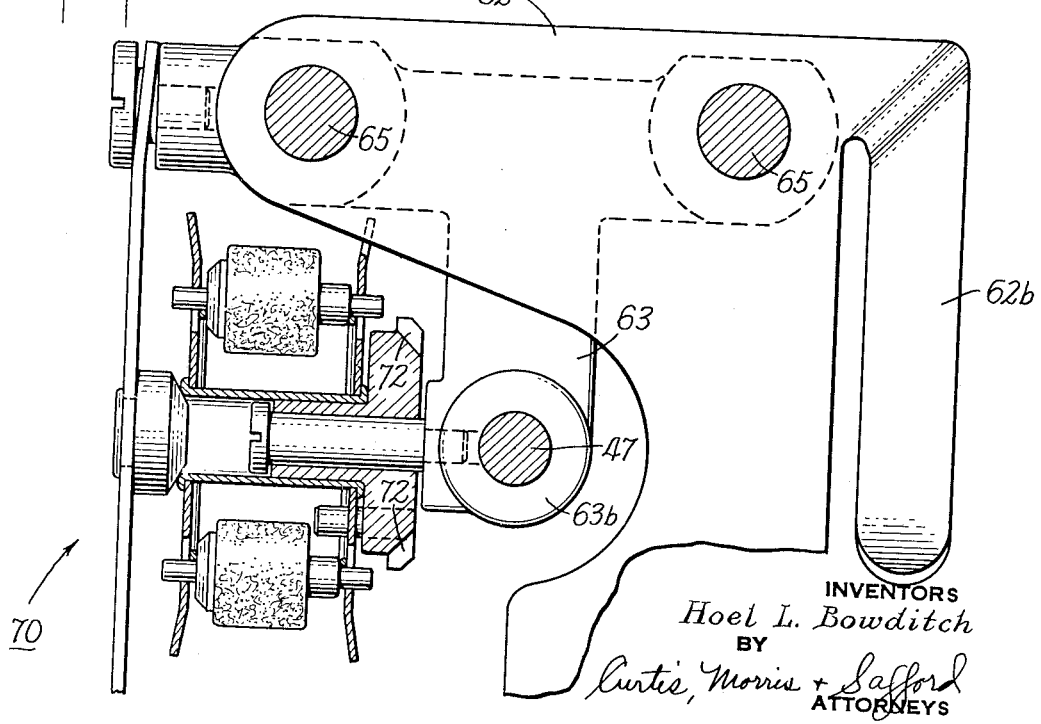
Figure 4 is a broken vertical section taken on line 4—4 of Figure 3, showing in greater detail the construction of the inking mechanism.

Referring to Figures 3 and 4, shaft 47 which supports and drives rotor 60 passes through arm 63b of a fixed bracket (not shown) which provides a bearing support for the shaft and keeps rotor 60 in radial alignment. Rotor 60 is suitably secured to shaft 47 by a set screw 47b. The inner end of rotor 60 has a beveled gear portion 60b which, as will be described, rotates the inking mechanism.

The pen holding portion of rotor 60 carries two annular racks 60c suitably secured by rivets 60d to the rotor. Referring to Figure 5, each rack 60c has six hook-shaped holding notches 60a. The racks 60c are spaced and aligned to receive pen shanks 10a and hold them ready to transfer to pen holder 9. The racks 60c are spaced to coact with the pen shoulders 10b and 10c to axially align the pens with respect to the rotor.

Pen holding notches 60a are so shaped that when the pen holder moves a pen into a notch, as shown in Figure 5, the rotor rotates one-sixth of a revolution, the notch engages the pen and pulls it from magnet 9a. The leading edge of each notch 60a is sloped as shown to guide the pen to the bottom of the notch and against the edge that engages the pen to pull it from the magnet. This construction eliminates need of close tolerances in manufacturing and adjustment, and need of exactly aligning magnet 9a with respect to the notches when presenting a pen thereto.

As shown in Figure 3, ring 61 is positioned with its holding edge 61a midway between racks 60c, and is radially spaced to hold the pens in notches 60a, without interfering with rotation of the rotor. The shape of the holding notches 60a and the direction of rotation of rotor 60 prevents pens rolling out on the leading edges of the notches and binding the rotor as it rotates.

Ring 61 is open at 61b to receive pen holder 9 and to permit access to rotor 60. The opening 61b is small enough to prevent a pen from dropping past holder 9 after it has been removed from the holder by rotation of rotor 60.

As previously mentioned, shaft 47 and rotor 60 are conveniently rotated in steps by notched driving wheel 46 (or equivalent mechanism) (Figure 2) which is intermittently driven by constantly revolving roller 44 (mounted on gear 40) engaging notches 45 spaced equidistant around wheel 46. Each time driving roller 44 revolves it enters and leaves a notch 45, and in so doing rotates disc 46 through one-sixth of a revolution. As the roller 44 leaves a notch, the succeeding notch is positioned to receive roller 44 on its next trip around.

To insure alignment of notches 60a with opening 61b on each one-sixth rotation of rotor 60, suitable detent mechanism 55 is provided that is diagrammatically shown in Figure 2 and more fully shown in our parent application, Serial No. 83,272 referred to above. This mechanism comprises a rocker arm 55a mounted on a shaft 55b that can be suitably journaled in a fixed support. Mounted on arm 55 is a roller 55c, and a spring 55d urges roller 55c against the periphery of wheel 46. One end of spring 55d is anchored to a pin 55e on the lower end of rocker arm 55a, and the other end of the spring is secured to a fixed support, the spring being biased to urge roller 55c against wheel 46. The diameter of roller 55c is greater than the width of the notches, and its action in partially entering the notches performs a detent action that insures correct positioning of notches 60a or rotor 60.

Referring to Figure 1, the plate 62 has a downwardly extending finger 62b that extends over the chart 4 to keep it flat, so that the chart cannot catch on the pen tip as the pen holder takes a pen from the magazine and moves it over the chart.

The tips of pens 10 are inked by inking mechanism generally indicated by numeral 70 as shown in Figures 3 and 4. In general the inking mechanism comprises a rotatable structure supporting six ink pads—one for each pen. The structure is rotated in synchronism with rotor 60, and during each complete rotation of rotor 60 each pen receives an individual inking. Rotation of the inking mechanism is effected by means of a bevel gear 72 that meshes with gear 60b of the pen magazine, thus producing synchronized movement of inking mechanism and magazine. Structural details of the inking mechanism are described in application Serial No. 83,272 referred to above.

When the recorder is used as a single record recorder, each of the six ink pads has the same color ink. If it is used as a two-record recorder, every other ink pad will have the same color; as a three-record recorder, every third pad will have the same ink. When used as a four-record recorder, four of the pads will have different colors and the two remaining pads will have colors corresponding to two of the first four pads. With this arrangement, the pen will print two of the records more frequently than the other two records. The same condition applies when it is used for making five records, in which event one of the five records will be printed more frequently than the other four.

But another advantage of the invention is that other sequence combinations than those above described may be used. Thus, by merely arranging the ink pads and arranging the switching mechanism to connect the measuring elements in a sequence to match the ink pad arrangement, different recording sequences may be set up.

It is also contemplated that instead of having pens 10 such as shown, each pen may contain its own ink reservoir. The construction may be like that of the usual ball tip pen, or of any other convenient construction designed to provide a pen that may print a large number of times without replenishing of its ink supply. When reservoir pens of this type are used, there is, of course, no need for the inking mechanism 70.

As above pointed out, suitable mechanism (designated 58 in Figure 2) is provided to switch the condition-measuring mechanism from one measuring element to another after each printing operation and while the pen arm is at magazine 11. The measuring elements may be, for example, thermocouples, pH cells, resistance bulbs, or other types of elements having an electrical characteristic that changes in accordance with change of the condition being measured. The switching mechanism 58 may be of the type disclosed in Cobbett United States Patent 2,184,611, issued December 26, 1939.

As above pointed out, the electrically operated measuring mechanism may be of any known type, for example, such as that shown in the patent application of Wilfred H. Howe and Robert W. Cushman, Serial No. 637,733, filed December 28, 1945. The switching mechanism preferably is so adjusted that as the switch rotates it disconnects the measuring mechanism from the element last measured and only momentarily leaves the measuring mechanism unconnected before reconnecting it with the next measuring element. With such operation there is only a slight quiver of arm 17 and positioning arm 20, as the switching operation takes place, and maximum time is allowed for the balancing operation of the measuring apparatus.

The measuring apparatus itself is preferably constructed always to come to balance within the three and one-half seconds or less after being switched to a measuring element. Of course, if measuring apparatus having slower balancing time is required, the six second cycle may be increased by slowing down the overall operation, as by slowing the speed of motor 43.

There are, however, advantages in having a rapid printing cycle. The above-mentioned six-second printing cycle is much faster than the printing cycles of conventional multi-record recorders, and makes it possible to use radial displacement of adjacent dots printed by the recorder to measure the rate of change of a condition being measured. Such is not practical when much slower printing cycles are used in producing as many as six records. If measuring mechanism having a still faster balancing time than three and one-half seconds (i. e., one that, for example, can cause the pen arm to traverse the chart in two seconds) is used, the six-second printing cycle may by reduced by the amount of the reduction in balancing time.

Although in the illustrative embodiment here described provision is made for recording six different variables, it is to be understood that multiple record recorders embodying the invention may be manufactured for recording a larger number of variables than six. To this end, referring to Figure 2, the pen magazine could be provided with more than six pens and the switching mechanism provided with more than six stations. The number of pens and switch stations is limited only by practical manufacturing considerations. As the number of pens is increased, it is evident that the notches in drive wheel 46 would be increased accordingly. It is also understood that other types of mechanism to obtain the intermittent uni-directional drive of shaft 47 may be used in place of the mechanism disclosed.

With reference to the nature of the marking device carried by pen arm 7, it is to be understood that in place of color identification other known mechanisms for producing identifying marks may be used and such marking mechanism may be conditioned for each printing operation while the pen arm is held to one side of the chart. It will of course be understood that the pen arm assembly of the present invention can be used with advantage in various modifications of the recorder illustratively described herein, such as, for example, the modifications disclosed in our parent application, Serial No. 83,272. Also this pen arm assembly is useful in a single record recorder in cases where ready replacement of the pen may be desirable.

Since many embodiments might be made of the present invention and since many changes might be made in the embodiment disclosed herein, it is to be understood that the foregoing description is to be interpreted as illustrative only and not in a limiting sense.

I claim:

1. In an industrial recorder, in combination, a recording arm movable over a chart to successive recording positions corresponding to the value of a variable condition whose behavior is to be recorded, a printing element comprising a cylindrical barrel portion and a printing pen, a U-shaped printing element support secured to said recording arm and having a pair of arms constructed and arranged to engage the barrel portion of said printing element, one of said cylindrical barrel and printing element support being a magnet and the other being made of a magnetic material to cause said barrel portion to be held against the arms of said printing element support by magnetic attraction, the barrel-engaging ends of the arms of said printing element support having a substantial thickness length-wise of said barrel and being spaced apart a distance less than the diameter of the barrel portion of said printing element, whereby when said printing element and support are brought close to each other the printing element is attracted to the support and aligns itself in the proper position with respect to said recording arm to make a mark on said chart that is accurately representative of the position of said recording arm.

2. In an industrial recorder, in combination, a recording arm movable over a chart to successive recording positions corresponding to the value of a variable condition whose behavior is to be recorded, a printing element comprising a cylindrical barrel portion made of a magnetic material and a printing pen, a U-shaped magnet secured to said recording arm and having a pair of arms constructed and arranged to engage a barrel portion of said printing element, the barrel-engaging ends of the arms of said magnet having a substantial thickness length-wise of said barrel and being spaced apart a distance less than the diameter of the barrel portion of said printing element, whereby when said printing element and magnet are brought close to each other the printing element is attracted to the magnet in the proper position with respect to said recording arm to make a mark on said chart that is accurately representative of the position of said recording arm.

3. The combination of claim 2 and wherein the barrel portion of said printing pen is provided with a pair of spaced flanges positioned to cooperate with the barrel-engaging arms of said magnet to insure proper positioning of said printing pen with respect to said recording arm.

4. In an industrial multi-record recorder the combination of a recording arm movable over a chart to successive recording positions corresponding to the values of variable conditions whose behaviors are to be recorded, a magnet mounted on said recording arm holding by magnetic force a cylindrically shaped printing pen and operative intermittently to print on said chart the successive recording positions of said recording arm, and a magazine holding a plurality of said printing pens and operative after each printing operation to remove the pen from said magnet and to present another pen in its place.

5. In an industrial multi-record recorder the combination of a recording arm movable over a chart to successive recording positions corresponding to the values of variable conditions whose behaviors are to be recorded, a magnet mounted on said recording arm holding by magnetic force a cylindrically shaped printing pen and operative intermittently to print on said chart the successive recording positions of said recording arm, a magazine holding a plurality of said printing pens and operative after each printing operation to remove the pen from said magnet and to present another pen in its place, said magnet having a U-shaped cross section and having two oppositely disposed parallel pen-supporting edges, one of said edges being shorter than the other and spaced symmetrically with respect to the longer edge whereby when said magazine presents a pen to said magnet, the edges coact to align said pen on said edges.

6. An industrial recorder as defined in claim 4, and in which said magnet is alternately moved from recording position to said magazine and returned to recording position, and in which said magazine includes a member having a plurality of pen holding pockets movable in succession to a pen-changing position, each pocket being so constructed that when said magnet is at said changing position and said member moves, the empty pocket at said position pulls the pen from said magnet, and the succeeding pocket that moves a pen to said magnet leaves the pen free for removal from such pocket by said magnet when it leaves said magazine to return to recording position.

7. An industrial recorder as defined in claim 4 and in which the printing pens have a pair of spaced tapered flanges positioned to cooperate with said magnet to ensure proper axial positioning of said pens with respect to said magnet.

References Cited in the file of this patent

UNITED STATES PATENTS

| | | |
|---|---|---|
| 1,754,503 | Dwelle | Apr. 15, 1930 |
| 2,297,806 | Smith | Oct. 6, 1942 |
| 2,438,231 | Schultz et al. | Mar. 23, 1948 |
| 2,475,573 | Smith et al. | July 5, 1949 |
| 2,591,138 | Cooley | Apr. 1, 1952 |
| 2,600,822 | Garnall et al. | June 17, 1952 |